US007121175B2

(12) United States Patent
Anderson (10) Patent No.: US 7,121,175 B2
(45) Date of Patent: Oct. 17, 2006

(54) WHEEL NUT TOOL

(76) Inventor: James Anderson, 226 Kirk St., Ypsilanti, MI (US) 48197

( * ) Notice: Subject to any disclaimer, the term of this patent is extended or adjusted under 35 U.S.C. 154(b) by 0 days.

(21) Appl. No.: 10/932,246

(22) Filed: Sep. 1, 2004

(65) Prior Publication Data
US 2006/0042430 A1    Mar. 2, 2006

(51) Int. Cl.
*B25B 23/00*    (2006.01)
(52) U.S. Cl. .......................... 81/462; 81/180
(58) Field of Classification Search ................ 81/462, 81/52, 53, 54, 180
See application file for complete search history.

(56) References Cited
U.S. PATENT DOCUMENTS

| | | | | |
|---|---|---|---|---|
| 3,158,050 A | * | 11/1964 | Shandel | 173/93 |
| 3,577,818 A | * | 5/1971 | Cramer et al. | 81/462 |
| 3,905,254 A | * | 9/1975 | Palatnick et al. | 81/57.3 |
| 4,063,475 A | * | 12/1977 | Perkins | 81/57.22 |
| 4,274,310 A | * | 6/1981 | Michaud | 81/57.36 |
| 4,553,456 A | * | 11/1985 | Rafert | 81/462 |
| 4,630,511 A | * | 12/1986 | Shirley | 81/462 |
| 4,875,395 A | * | 10/1989 | Alvarez | 81/13 |
| 5,074,170 A | * | 12/1991 | Shirley | 81/57.3 |
| 5,910,198 A | * | 6/1999 | Maher et al. | 81/462 |
| 6,041,681 A | * | 3/2000 | Griffin, Sr. | 81/462 |
| 6,044,729 A | * | 4/2000 | Jones | 81/57.14 |
| 6,134,989 A | * | 10/2000 | Stevens | 81/57.22 |
| 6,634,260 B1 | * | 10/2003 | Smith | 81/57.36 |
| 6,662,692 B1 | * | 12/2003 | Anderson et al. | 81/462 |
| 6,748,832 B1 | * | 6/2004 | Maxwell | 81/462 |

* cited by examiner

*Primary Examiner*—David B. Thomas
*Assistant Examiner*—Robert Scruggs
(74) *Attorney, Agent, or Firm*—Barbara M. Burns (57) ABSTRACT

A device for use with a tool for rotating a wheel nut of a vehicle. The device is fittable to a diameter of a wheel to facilitate the turning of a wheel nut for loosening for removal of the wheel from the vehicle or for tightening the wheel to the vehicle. The device has a outer diameter, the device comprising a monolithic star-shaped body having extended portions that extend to a diameter that approaches the inner diameter of the wheel or fits around the outer diameter of the wheel. Apertures through the device are arranged in a base circle pattern that matches the diameter circle of the wheel nuts. An aperture is provided for the axle hub. A stabilizer can be used with a sleeve for maintaining the tool along the centerline.

3 Claims, 9 Drawing Sheets

WHEEL NUT TOOL

BACKGROUND OF THE INVENTION

The field of the invention pertains to wheels for vehicles, such as cars, trucks, dual-wheel heavy trucks, trailers, etc., and, in particular, to the positioning of a wrench to facilitate tightening or loosening wheel nuts for the wheel.

Normally a wheel wrench having a socket is employed to tighten or loosen wheel nuts that hold the wheel onto the vehicle.

A problem is that the wrench (with a socket, an extension, a ratchet and a breaker bar/speed handle) used to loosen the wheel nuts can and often does slip from the nut when the handle of the wrench tool is moved. The slipping of the wrench can cause rounding of the points of the nut. Another problem is that both of the user's hands are needed to remove wheel nuts when using a single handle. One hand holds the socket on the wheel nut and the other hand applies force to the breaker bar. Use of the breaker bar requires balancing; while pushing down on the breaker bar the user needs to pull up with the other hand to balance the end of the extension and to give leverage to the other hand.

Should the wrench socket slip from the nut, the wrench can move and can cause the user to lose balance and/or the wrench can hit the user's legs, causing bruising or breaking. Thus, a need existed for a wheel nut tool that helps the user to maintain the socket of the wrench on the nut of the wheel without causing injury or discomfort to the person using the wrench.

SUMMARY OF THE INVENTION

The invention is a device for positioning a socket of a wrench in close controlled centered proximity to a nut holding a wheel to a vehicle. The device holds the socket in a desired orientation aligned with the centerline of the wheel nut and allows leverage to be applied to the wheel nut. A stabilizer device and a sleeve can further stabilized the socket extension.

The device of the invention comprises a monolithic star body fittable to an inner diameter of a wheel after placing the socket to the nut. The device is removable following use to assist with attaching the wheel or removing the wheel by tightening or loosening and removing the wheel nuts.

The body of the device is comprised from steel, other metals, fiberglass or other materials. Lighter weight materials are useful when the body of the device must be large to use with a large wheel. The body can have a star shape or other shape that has an outer diameter that approaches the size of the inner diameter of the wheel. The body fits into the inner diameter of the wheel. Apertures are provided through the body along the base circle of the wheel. An aperture is also provided for the protrusion of an axle hub. Alternately, the device can be designed to fit over a wheel rim.

To use the wheel nut tool of the invention, a socket is placed on a wheel nut and the body of wheel nut tool is placed into the inner diameter of the wheel with an aperture of the wheel nut tool being lined up over the socket drive receptacle. An extension for the socket is placed through the wheel nut tool and engaged with the socket drive receptacle. A handle is then attached to the extension and the handle is turned to rotate the wheel nut in the desired direction. The handle can use a ratchet head with a short handle or a longer handle for more leverage. A speed handle having a T-shape or an impact tool can also be used. One hand use can be made with a single handle because the body of the invention maintains the extension centered on the socket and hence also centered on the wheel nut.

The wheel nut tool stabilizes and maintains the socket extension in alignment with the centerline of the wheel nut. Wobble of the extension is limited. The user does not have to apply one hand to keep the socket and extension on the wheel nut and also aligned with the centerline of the wheel nut. Using both hands on the handle allows leverage to be placed on the breaker bar or handle for the socket through the socket extension. The wheel nut tool allows use of both hands on the handle creating greater force. The star shaped body for the wheel nut tool limits any lateral movement from the socket to be distributed among the other points of the body beside the point though which the socket extension is placed. A longer extension handle can be employed to exert greater leverage to the wheel nut. An impact tool can also be used in conjunction with the wheel nut tool. A crank handle can also be used.

For a more complete understanding of the present invention, reference is made to the following detailed description when read with in conjunction with the accompanying drawings wherein like reference characters refer to like elements throughout the several views, in which:

BRIEF DESCRIPTION OF THE DRAWINGS

FIG. 4C-1 illustrates a perspective view of the device of the invention showing ball bearings in broken out section under a rotatable ring and detents to stop rotation of the rotatable ring and a stabilizer device;

FIG. 4C-2 illustrates a perspective view of the stabilizer device of FIG. 4C-1;

FIG. 4C-3 illustrates a perspective view of a ratchet head with shaft of a ratchet wrench and the stabilizer device with the ratchet extension shown aligned with a sleeve through the stabilizer device;

DESCRIPTION OF THE PREFERRED EMBODIMENT

Figure 1:
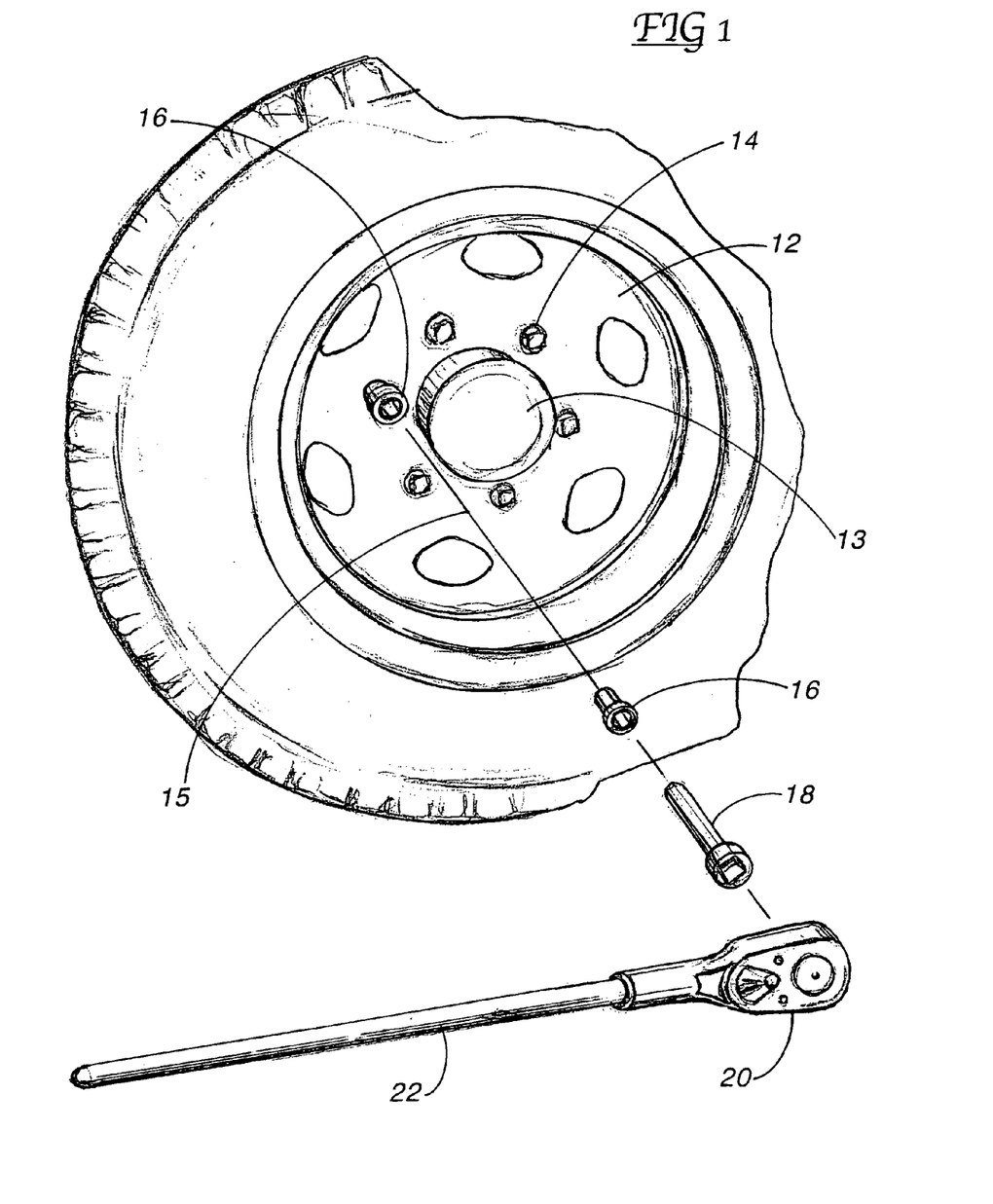
FIG. 1 illustrates an environmental view of a socket on a wheel along with an exploded view of a socket removed from the wheel nut with an extension and a ratchet head with handle.
Figure 2:
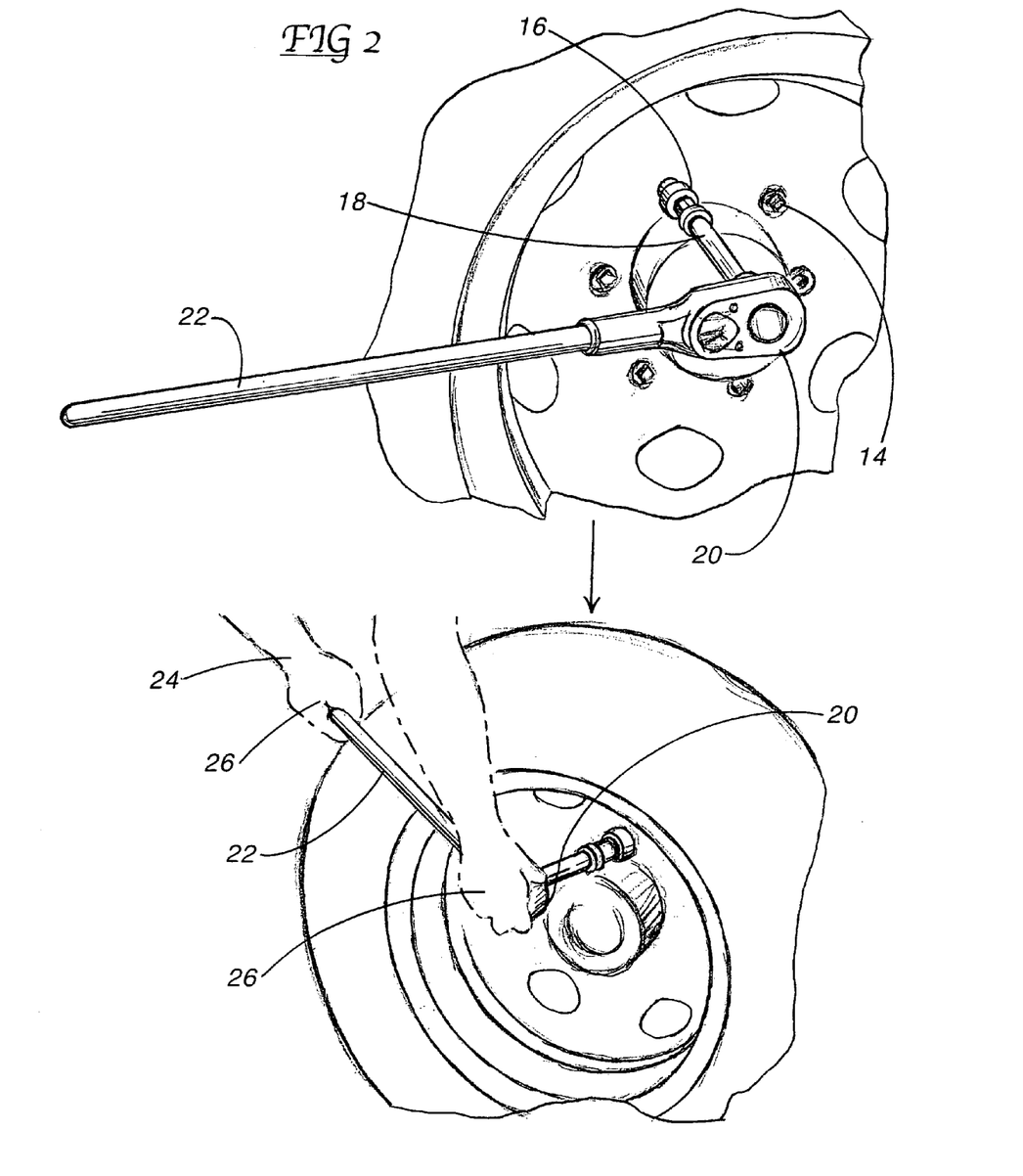
FIG. 2 illustrates a perspective view of ratchet of FIG. 1 applied to the wheel nut holding the wheel, with the lower part of FIG. 2 showing a user employing both hands to use the ratchet.

Illustrated in FIGS. 1 and 2, wheel 12 has wheel nuts 14 holding wheel 12 to a vehicle (not shown). Axle hub 13 is centered in wheel 12. Socket 16 is shown placed on wheel nut 14 along centerline 15. Socket 16 is also shown as exploded away from wheel 12 with extension 18, ratchet head 20 and handle 22.

FIG. 2 depicts extension 18 applied to socket 16 on wheel nut 14. Ratchet head 20 is attached to extension 18 and handle 22 connects with ratchet head 20. Lower FIG. 2 depicts user 24 (shown in phantom)employing both hands 26 to operate ratchet head 20 and handle 22 of upper FIG. 2.

Figure 3:
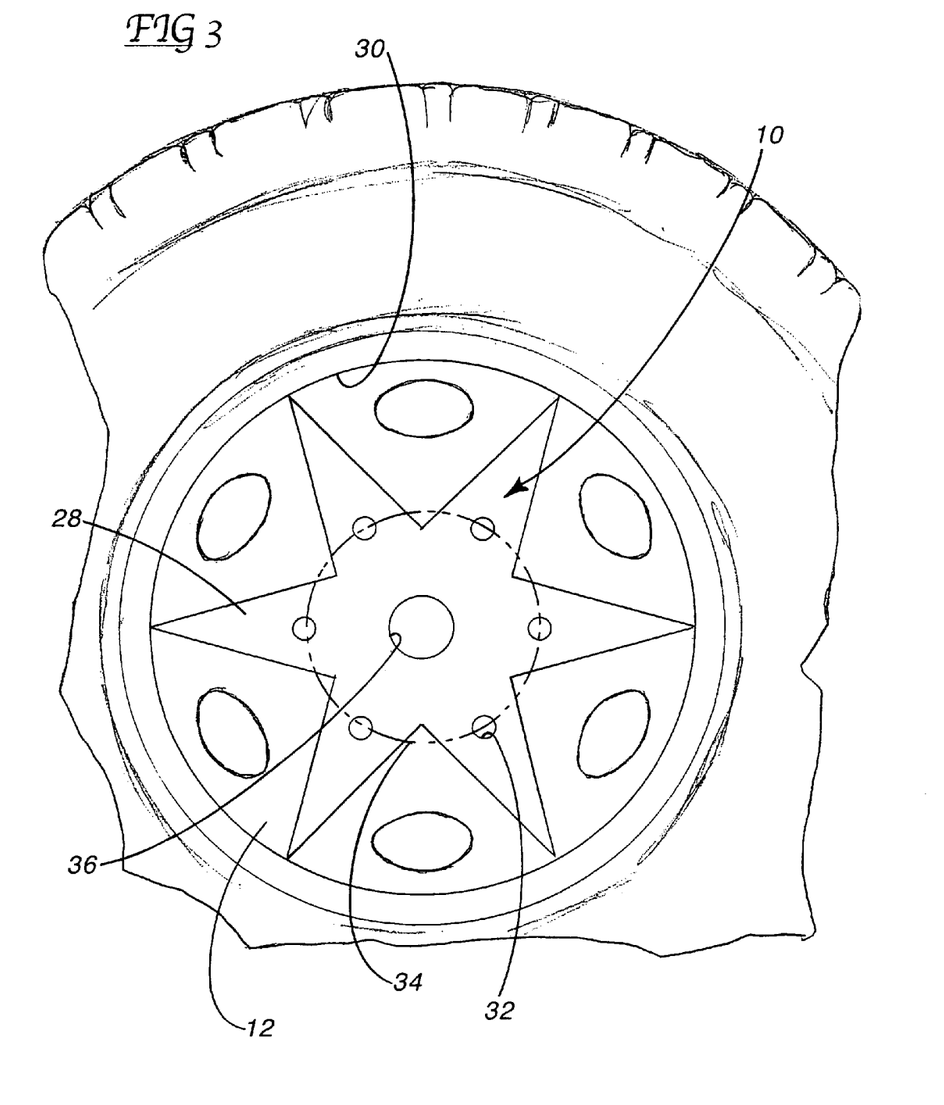
FIG. 3 illustrates a front view of the device of the invention placed a wheel of a vehicle.

Now turning to FIG. 3 thereshown is device 10 of the invention. Device 10 comprises body 28 fittable to inner diameter 30 of wheel 12. Apertures 32 are provided through body 10 around base circle 34 of wheel 12. Apertures 32 can be of different sizes to accommodate different diameter sizes of ratchet extensions 18 or a sleeve 52 (better in FIG. 4C-2) through which an extension 18 can be piloted. Aperture 36 provides for protrusion of axle hub 13 (shown in FIG. 1).

Figure 4A:
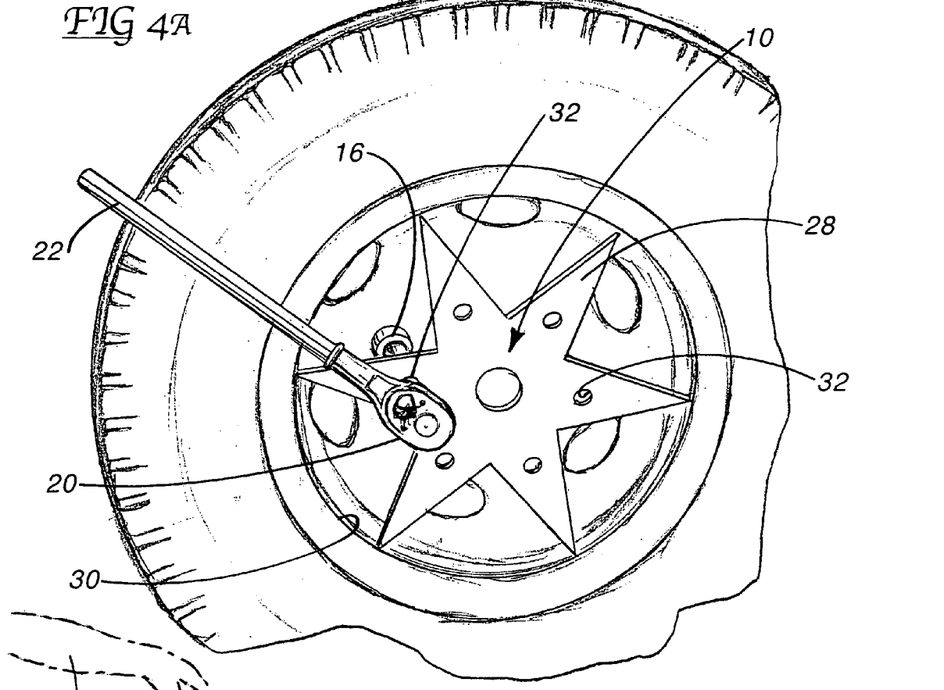
FIG. 4A illustrates a perspective view of the device of the invention placed over a wheel nut and the extension through the device.

FIG. 4A shows socket 16 on wheel nut 14. Body 28 of device 10 placed to inner diameter 30 of wheel 12. Aperture 32 is aligned with socket 16 and extension 18 engages with socket 16 through aperture 32. Ratchet head 20 is connected with extension 18 and handle 22 is attached to ratchet head 20.

Figure 4B:
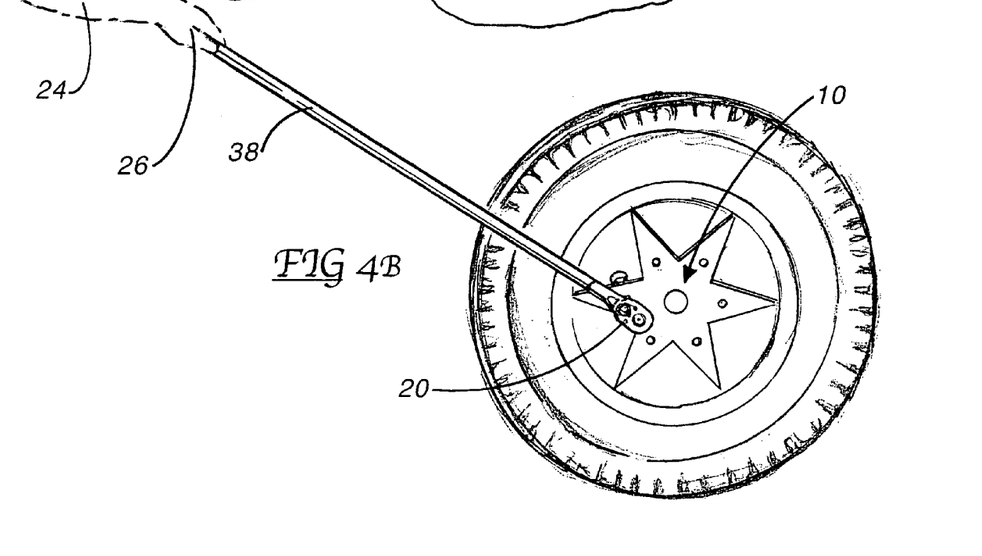
FIG. 4B illustrates a perspective view of the device of the invention placed over a wheel nut and the extension through the device as in FIG. 4A with a longer handle and show the use by one hand use.

As shown in FIG. 4B a longer handle 38 is employed with device 10. User 24 (shown in phantom) employs only one hand 26 to operate ratchet head 20.

Figure 4C:
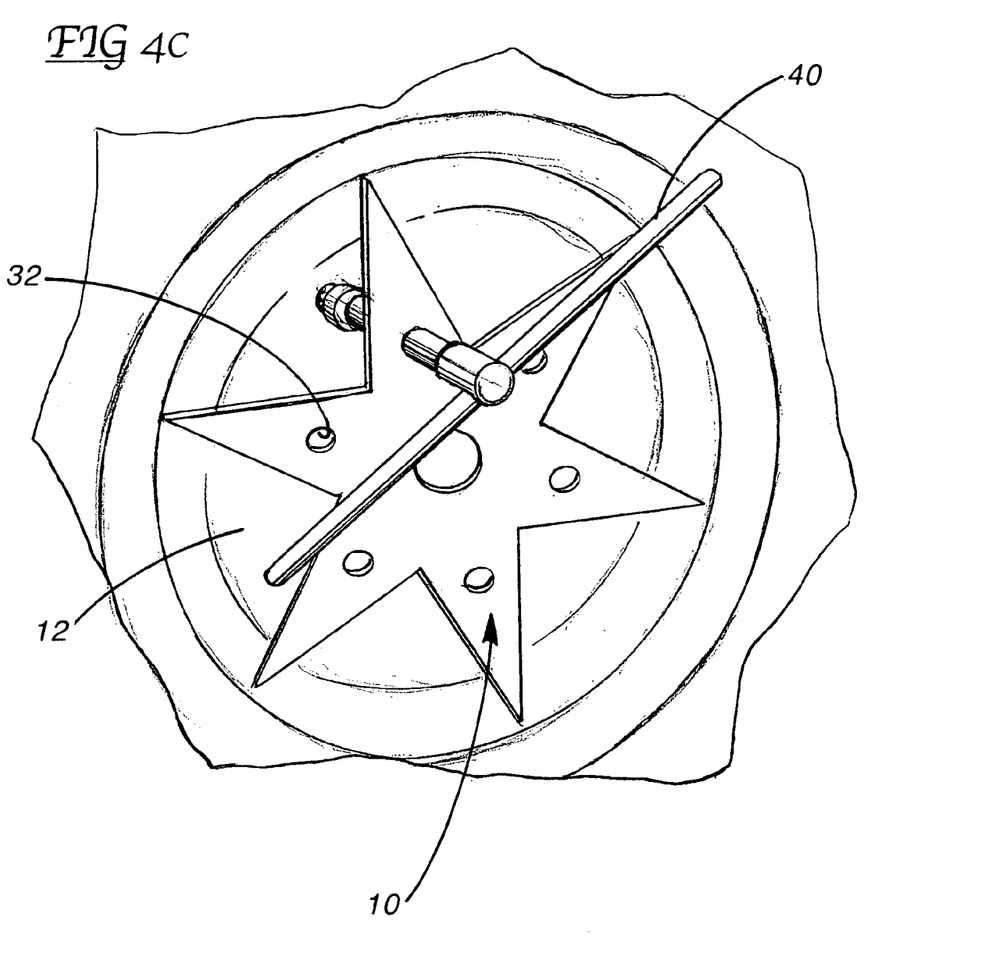
FIG. 4C illustrates a perspective view of the device of the invention placed over a wheel nut and the extension through the device as in FIG. 4A with a speed handle.

Now turning to FIG. 4C, thereshown is speed handle 40 for use with device 10. Device 10 is removable after use to assist with attaching wheel 12 or removing wheel 12 by tightening or loosening and removing wheel nuts 14.

In use, socket 16 is placed onto wheel nut 14. Body 28 of device 10 is then fitted to inner diameter 30 of wheel 12. Extension 18 is placed through aperture 32 of body 28 and ratchet head 20 with handle 22 or 38 or speed handle 40 is attached to extension 18. Thereafter, handle 22 or 38 or speed handle 40 is rotationally operated to tighten or loosen wheel nut 14.

Figure 4C:
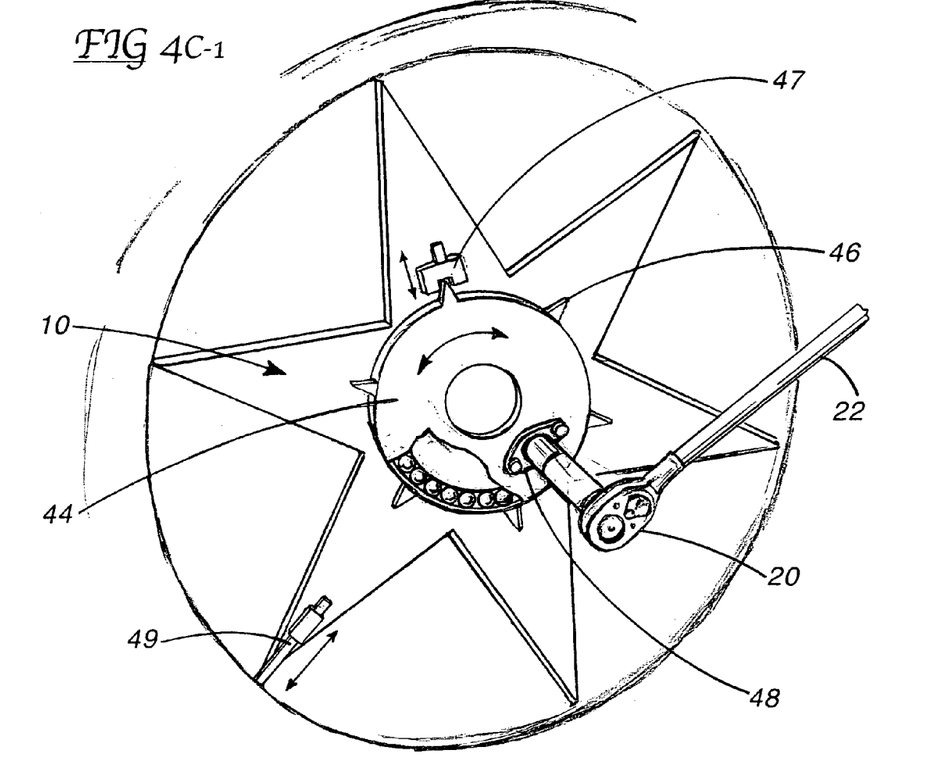
Figure 4C:
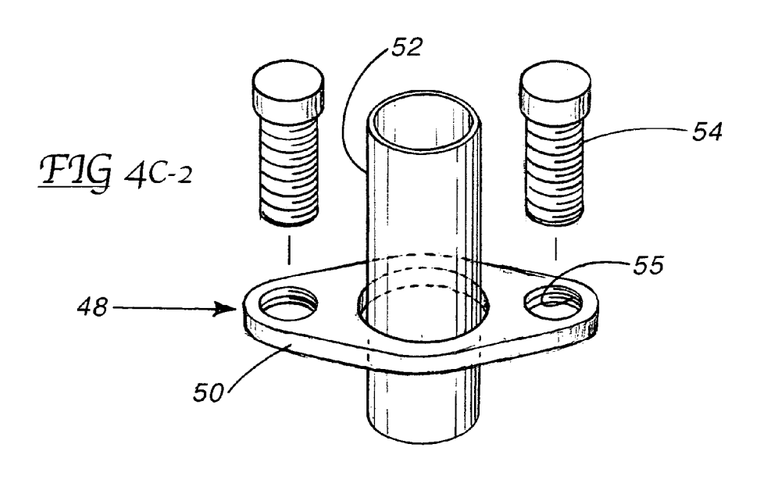

FIG. 4C-1 illustrates a perspective view of the device 10 with ball bearings 42 shown in broken out section under rotatable ring 44. Detents 46 are provided to control rotation of rotatable ring 44. Sliding latch 47 locks detent 46 in place. Detent 46 can employ a nub under detent 46 to frictionally engage with aperture in body 10 to hold rotating ring 44 in position. Other types of detents can be advantageously employed such as a positive lock 47. Stabilizer device 48 employs plate 50, sleeve 52 and bolts 54. Stabilizer device 48 allows extension 18 of ratchet to be piloted through device 10 thereby maintaining extension 18 better centered to wheel nut centerline 15, limiting wobble. Latch 49 can extend from body 28 in order to fit device 10 to a variety of wheel diameters.

Figure 4C:
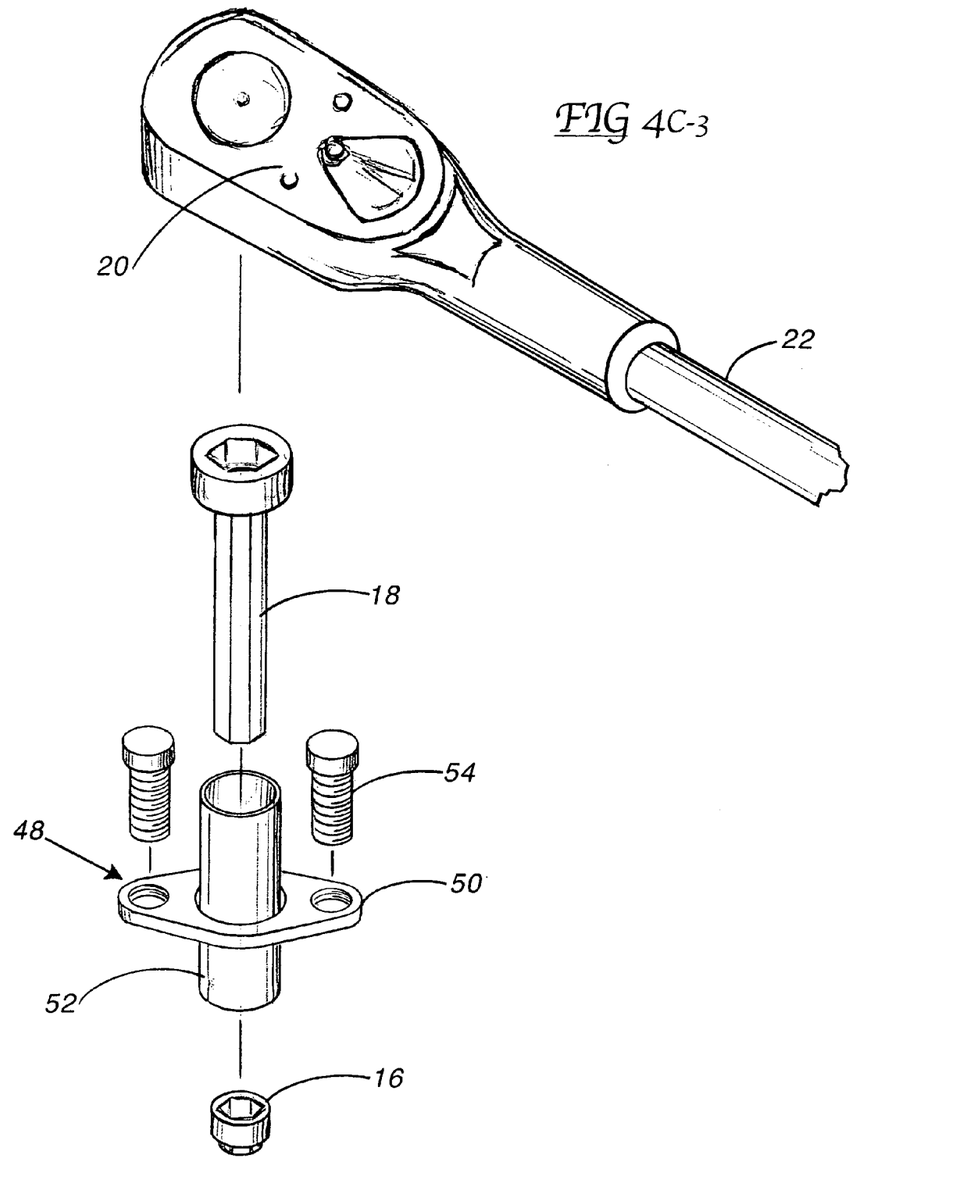

Stabilizer device 48 is shown in FIG. 4C-2 with plate 50, sleeve 52 placed through plate 50 and bolts 54 threaded for engagement with threaded apertures 55. Bolts 54 threaded into apertures 55 can raise plate 50 above rotating ring 44. Ratchet head 20 with shaft 22 comprising ratchet wrench is depicted in FIG. 4C-3. Stabilizer device 48 with ratchet extension 18 shown aligned with sleeve 52 placed through stabilizer plate 50 to engage socket 16.

Figure 5:
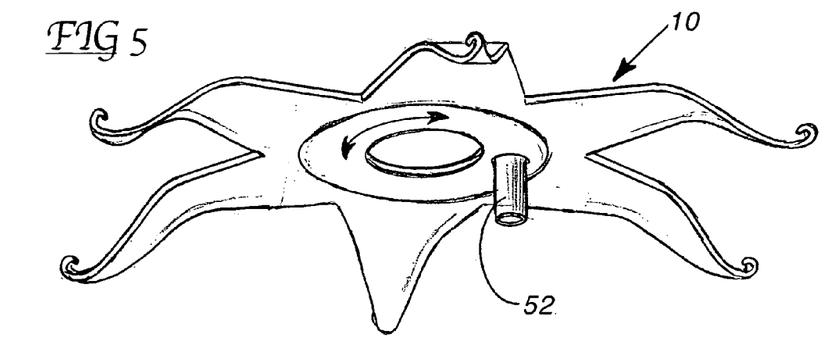
FIG. 5 illustrates a perspective view of the device of the invention for use on the outer edge of a wheel.

Device 10 for use with the front wheel of a vehicle is depicted in FIG. 5. Device 10 for use on a front wheel can be curved in like an oval with thickness of body of device 10 being shaped to match a profile of wheel rim. Device 10 can be positioned on the outer edge of a wheel with prongs/hooks 53 of device 10 fitting into inner diameter of wheel or hooking over outer diameter of wheel (better seen in FIG. 6). Device 10 shown in FIGS. 5 and 6 can be employed on a smaller vehicle, such as a passenger car.

Figure 6:
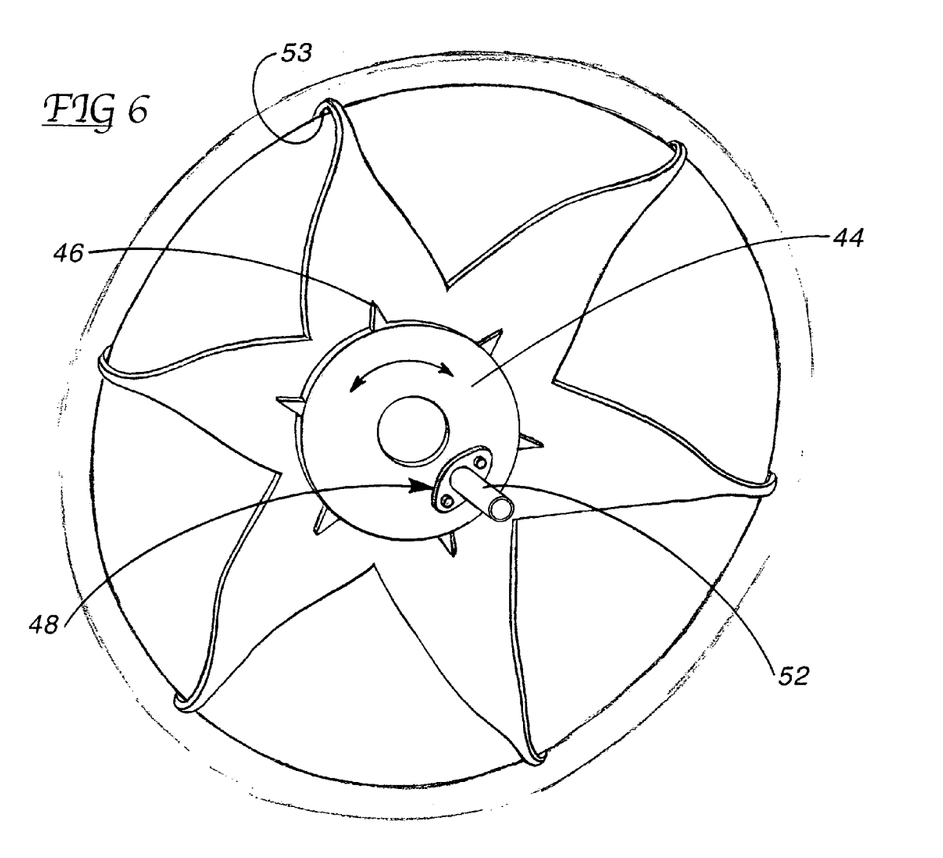
FIG. 6 illustrates a perspective view of the device shown in FIG. 5 with a rotatable ring and a stabilizer device.

FIG. 6 depicts device 10 could be reversed with the prongs wrapping around edge of wheel rim. Rotatable ring 44 and detents 46 as well as stabilizer device 48 are hereshown.

Figure 7:
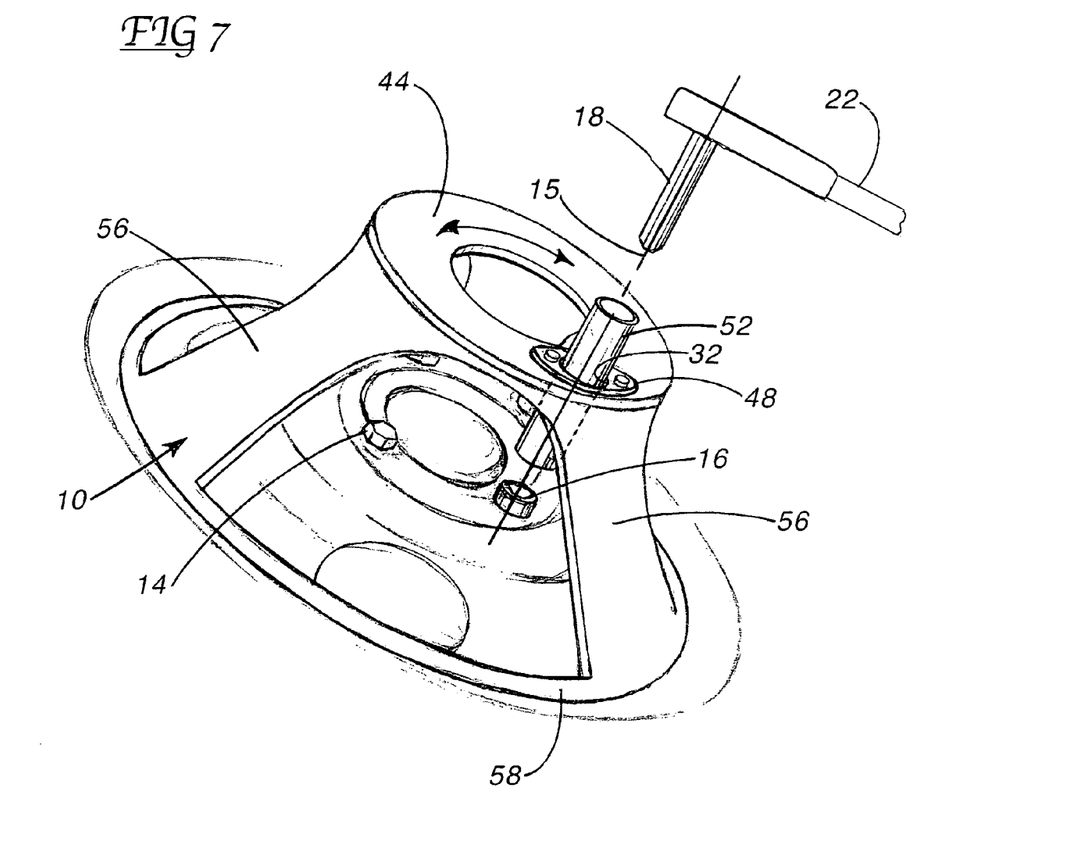
FIG. 7 illustrates a perspective view of the device of the invention for use on a wheel of a heavy duty vehicle.

Device 10 is depicted in FIG. 7 for use on a wheel of a heavy duty vehicle, such as a semi-truck. Ring 44 with aperture 32 through ring 44 (can be a rotating ring 44) is spaced on leg 56 away from the base 58 of device 10 to accommodate multiple tires or deep wells on a wheel.

It is to be understood that the device herein described could be employed for uses and purposes beyond those for stabilizing a tool for the rotation of wheel nuts for the attachment and removal of a vehicle wheel.

Having described the invention, many modifications thereto will become apparent to those skilled in the art to which it pertains without deviation from the spirit of the invention as defined in the appended claims.

The invention claimed is:

1. A device for stabilizing a tool for rotating a wheel nut for positioning and one of retaining and removing of a wheel mounted to a vehicle, the wheel of the vehicle being retained to the vehicle by rotating at least one wheel nut in a direction to tighten the wheel nut and the wheel being removable from the vehicle by rotating at least one wheel nut in a direction to loosen and remove the at least one wheel nut, the wheel having at least an inner diameter and an outer diameter, the device comprising a monolithic star-shaped body having extended extended portions, the extended portions extending to a diameter, the diameter of the monolithic star-shaped body being related to a diameter of the wheel, and the monolithic star-shaped body having apertures though the monolithic star-shaped body the apertures being spaced in a circle matchable with a base circle of a wheel.

2. A device for stabilizing a tool for rotating a wheel nut for positioning and one of retaining and removing of a wheel mounted to a vehicle according to claim 1 wherein the device comprising a monolithic starshaped body having a shape with extended portions, the extended portions extending to a diameter, the outer diameter of the monolithic star-shaped body being nearly the inner diameter of the wheel, and the monolithic star-shaped body having apertures though the monolithic star-shaped body, the apertures being spaced in a circle matchable with a base circle of a wheel.

3. The device according to claim 1 wherein the monolithic star-shaped body further comprises an aperture centered in the monolithic star-shaped body, the aperture being fittable around an axle hub of the vehicle.

* * * * *